(12) United States Patent
Lee (10) Patent No.: US 10,046,856 B2
(45) Date of Patent: Aug. 14, 2018

(54) SYSTEM AND METHOD FOR CONTROLLING TAKEOFF AND LANDING OF DRONE

(71) Applicant: NAMSUNG CO., LTD., Seoul (KR)

(72) Inventor: Yong-Moo Lee, Seoul (KR)

(73) Assignee: Namsung Co., Ltd., Seoul (KR)

(*) Notice: Subject to any disclaimer, the term of this patent is extended or adjusted under 35 U.S.C. 154(b) by 173 days.

(21) Appl. No.: 14/920,121

(22) Filed: Oct. 22, 2015

(65) Prior Publication Data
US 2017/0003689 A1  Jan. 5, 2017

(30) Foreign Application Priority Data
Jul. 1, 2015 (KR) ........................ 10-2015-0094291

(51) Int. Cl.
| G05D 1/00 | (2006.01) |
| B64C 39/02 | (2006.01) |
| G05D 1/06 | (2006.01) |

(52) U.S. Cl.
CPC ......... *B64C 39/024* (2013.01); *G05D 1/0022* (2013.01); *G05D 1/0669* (2013.01);
(Continued)

(58) Field of Classification Search
CPC ... B64C 39/02; B64C 39/024; B64C 2201/14; B64C 2201/141; B64C 2201/146
(Continued)

(56) References Cited

U.S. PATENT DOCUMENTS

| 8,018,382 B2* | 9/2011 | Shore ............... E21B 47/02224 342/386 |
| 8,976,340 B2* | 3/2015 | Gilliland ............... G01S 17/107 356/4.01 |

(Continued)

FOREIGN PATENT DOCUMENTS

| KR | 1020150023397 A | 3/2015 | |
| KR | 101732357 B1 * | 5/2017 | ........... G05D 1/0676 |

(Continued)

OTHER PUBLICATIONS

Autonomous position control of multi-unmanned aerial vehicle network designed for long range wireless data transmission Seiko P. Yamaguchi; Filip Karolonek; Takanori Emaru; Yukinori Kobayashi; Tadeusz Uhl 2017 IEEE/SICE International Symposium on System Integration (SII); 2017; pp. 127-132.*

(Continued)

*Primary Examiner* — Cuong H Nguyen
(74) *Attorney, Agent, or Firm* — Baker & Hostetler LLP (57) ABSTRACT

Disclosed herein is a system and method for controlling the takeoff and landing of a drone. The system for controlling the takeoff and landing of a drone includes: a landing control device configured to vary the transmission range of Low Frequency (LF) landing control signals based on whether a response signal to a transmitted landing control signal in the transmission range is received, and to transmit a landing signal if the varied transmission range is less than a minimum radius; and a drone configured to fly in a control signal-based flight mode based on a landing control signal when receiving the landing control signal transmitted from the landing control device during GPS signal-based flight, and to land at a destination by flying in a landing mode when receiving a landing signal from the landing control device during flight in the control signal-based flight mode.

8 Claims, 8 Drawing Sheets

(52) U.S. Cl.
CPC ...... *G05D 1/0676* (2013.01); *B64C 2201/128* (2013.01); *B64C 2201/146* (2013.01)

(58) Field of Classification Search
USPC .......................................................... 701/2, 3
See application file for complete search history.

(56) References Cited

U.S. PATENT DOCUMENTS

| | | | |
|---|---|---|---|
| 9,049,740 B1* | 6/2015 | Tillotson | H04W 88/04 |
| 2008/0036652 A1* | 2/2008 | Shore | E21B 47/02224 |
| | | | 342/357.31 |
| 2009/0267734 A1* | 10/2009 | Kwon | B60R 25/2036 |
| | | | 340/5.72 |
| 2012/0261516 A1* | 10/2012 | Gilliland | G01S 17/107 |
| | | | 244/183 |
| 2014/0225761 A1* | 8/2014 | Garrec | G01S 13/74 |
| | | | 342/33 |
| 2015/0129716 A1 | 5/2015 | Yoffe | |
| 2015/0346344 A1* | 12/2015 | Gilliland | G01S 17/107 |
| | | | 356/5.01 |
| 2017/0003689 A1* | 1/2017 | Lee | G05D 1/0676 |
| 2017/0137150 A1* | 5/2017 | Conyers | B64F 1/007 |
| 2018/0061243 A1* | 3/2018 | Shloosh | G08G 5/0013 |

FOREIGN PATENT DOCUMENTS

| | | | | |
|---|---|---|---|---|
| WO | WO 2013171735 A1 * | 11/2013 | | B64F 1/02 |
| WO | WO-2014115139 A1 * | 7/2014 | | G08G 5/0013 |
| WO | WO-2017160192 A1 * | 9/2017 | | B64C 39/00 |

OTHER PUBLICATIONS

An interconnected architecture for an emergency medical response unmanned aerial system Karanam Ravichandran Dayananda; Rahul Gomes; Jeremy Straub 2017 IEEE/AIAA 36th Digital Avionics Systems Conference (DASC); 2017, pp. 1-6.*
Landing of VTOL UAVs using a stationary robot manipulator: A new approach for coordinated control Moritz Maier; Konstantin Kondak; 2015 54th IEEE Conference on Decision and Control (CDC); 2015, pp. 1497-1502.*
Command and Control (C2) to enable multi-domain teaming of unmanned vehicles (UxVs)Thomas Pastore; George Galdorisi; Anthony Jones Oceans 2017—Anchorage Year: 2017; pp. 1-7.*

* cited by examiner

SYSTEM AND METHOD FOR CONTROLLING TAKEOFF AND LANDING OF DRONE

CROSS REFERENCE TO RELATED APPLICATION

This application claims the benefit of Korean Patent Application No. KR 10-2015-0094291, filed Jul. 1, 2015, which is hereby incorporated by reference in its entirety into this application.

BACKGROUND OF THE INVENTION

1. Technical Field

The present invention relates generally to a system and method for controlling the takeoff and landing of a drone, and more particularly, to a system and method for controlling the takeoff and landing of a drone that is operated for the transport and delivery of goods.

2. Description of the Related Art

Generally, drones refer to unmanned airplanes flying without a human pilot aboard, under remote control from the ground. Drones are also called unmanned aerial vehicles (UAV) because their flight is controlled by remote control.

Originally, drones were developed for military purposes. For example, drones were developed for the purposes of target practice for air-force planes or antiaircraft guns, reconnaissance and surveillance, antisubmarine attacks, reconnaissance and information gathering.

Drones are equipped with cutting-edge equipment like remote sensors and satellite control devices, and are sent into places that are difficult for people to access or dangerous regions in order to collect information, or are equipped with offensive weapons in order to serve as attack planes for attacking enemies in place of a ground army.

In addition to military purposes, drones are used in various civilian applications. For example, they are used for photography in situations that are difficult for people to access (e.g., the crater of a volcano, the scene of a fire, etc.), expensive aerial photography, and unmanned parcel delivery services.

Delivery drones deliver goods to purchasers using the Global Positioning System (GPS). Specifically, a delivery drone flies to deliver goods to a delivery location based on a current location and the delivery location, measured using GPS information.

However, the delivery drone makes an error of about 10 m because it uses the GPS information. Such an error of about 10 m may be ignored in military or photographic applications.

However, when a delivery drone makes an error of about 10 m, the goods might be delivered to the wrong person, or might even be damaged due to landing on an unsafe place.

PRIOR ART DOCUMENTS

Patent Documents (Patent Document 1) Korean Patent Application Publication No. 10-2015-0023397 entitled "point takeoff and landing of drone objects")

SUMMARY OF THE INVENTION

Accordingly, the present invention has been made keeping in mind the above problems occurring in the prior art, and an object of the present invention is to provide a system and method for controlling the takeoff and landing of a drone, which controls a drone to take off or land by varying a transmission range based on whether a response signal to a takeoff control signal or a landing control signal has been received.

In order to accomplish the above object, the present invention provides a system for controlling the takeoff and landing of a drone, the system including a landing control device configured to vary a transmission range of Low Frequency (LF) landing control signals, based on whether a response signal to a transmitted landing control signal within the transmission range has been received, and to transmit a landing signal if the varied transmission range is less than a minimum radius; and a drone configured to fly in a control signal-based flight mode based on a landing control signal when receiving the landing control signal transmitted from the landing control device during Global Positioning System (GPS) signal-based flight, and land at a destination by flying in a landing mode when receiving a landing signal from the landing control device during flight in the control signal-based flight mode.

The landing control device may include a transmission range setting unit configured to set a maximum transmission radius to be a transmission range in an initial state and to vary the transmission range based on whether a response signal to a landing control signal is received; a landing control signal transmitter, configured to transmit an LF landing control signal based on the transmission range set by the transmission range setting unit; and a landing controller, configured to control the landing control signal transmitter to transmit a landing signal if the varied transmission range is equal to or less than the minimum transmission radius.

The transmission range setting unit may be configured to decrease the transmission range by a set radial unit when receiving a response signal to a landing control signal within a set period of time and to increase the transmission range by the set radial unit if no response signal to the landing control signal is received within the set period of time.

The drone may include a signal processor comprised of a three axis receiving antenna driven by a landing control signal for detecting the 3 directional landing control signal strength of a received landing control signal; a calculator configured to calculate three directional distances, namely X, Y, and Z direction distances, between a current location and the landing control device based on the detected 3 directional landing control signal strength and a reference signal strength of the landing control signal; a flight setting unit configured to set a flight mode and flight distance based on the calculated three directional distances and the current location; and a flight controller configured to control the drone in a control signal-based flight mode based on the flight mode and flight distance set by the flight setting unit, and control the drone in a landing mode when a landing signal is received from the signal processor.

The system may further include a takeoff control device configured to vary a transmission range of LF takeoff control signals based on whether a response signal to a takeoff control signal transmitted in the transmission range is received, and transmit a flight signal if the varied transmission range is equal to or greater than a maximum radius.

The takeoff control device may include a transmission range setting unit configured to set a minimum transmission radius to be a transmission range in an initial state, and vary the transmission range based on whether a response signal to a takeoff control signal is received; a takeoff control signal transmitter configured to transmit an LF takeoff control signal based on the transmission range set by the transmission range setting unit; and a takeoff controller configured to control the takeoff control signal transmitter to transmit a flight signal if the varied transmission range is equal to or greater than the maximum transmission radius.

The transmission range setting unit may be configured to increase the transmission range by a set radial unit when receiving a response signal to a takeoff control signal within a set period of time, and decrease the transmission range by the set radial unit when receiving no response signal to the takeoff control signal within the set period of time.

The drone may be configured to fly in a control signal-based flight mode based on a takeoff control signal transmitted from the takeoff control device, and fly in a GPS signal-based flight mode if receiving a flight signal from the takeoff control device during flight in the control signal-based flight mode.

The drone may include a signal processor comprised of a three axis receiving antenna driven by a takeoff control signal for detecting 3 directional takeoff control signal strength from the received takeoff control signal; a calculator configured to calculate three directional distances, namely X, Y, and Z direction distances, between a current location and a target takeoff point based on the detected three directional takeoff signal strength and reference signal strength of the takeoff control signal; a flight setting unit configured to set a flight mode and flight distance based on the calculated three directional distances and the current location; and a flight controller, configured to control the drone in a control signal-based flight mode based on the flight mode and flight distance set by the flight setting unit and to control the drone in a GPS signal-based flight mode when a flight signal is received from the signal processor.

In order to accomplish the above object, the present invention also provides a method for controlling the takeoff of a drone, the method including a takeoff control device setting a minimum transmission radius to be a transmission range; the takeoff control device transmitting a takeoff control signal in the set transmission range; the takeoff control device varying the transmission range based on whether a response signal to the transmitted takeoff control signal is received; and the takeoff control device transmitting a flight signal if the varied transmission range is equal to or greater than a maximum transmission radius.

Varying the transmission range, performed by the takeoff control device, may include increasing the transmission range if a response signal to the transmitted takeoff control signal is received within a set period of time and decreasing the transmission range if no response signal to the transmitted takeoff control signal is received within the set period of time.

The method may further include the drone that receives the takeoff control signal setting a flight mode and flight distance based on the takeoff control signal and flying in a control signal-based flight mode.

Flying in a control signal-based mode, performed by the drone, may include detecting 3 directional takeoff control signal strength based on the received takeoff control signal; calculating three directional distances, including X, Y, and Z direction distances, between a current location and a target takeoff point based on the detected three directional takeoff signal strength; setting a flight mode and flight distance based on the three directional distances; and flying in a control signal-based flight mode based on the flight mode and flight distance.

The method may further include the drone that receives the flight signal flying in a GPS signal-based flight mode based on GPS signals and destination information.

In order to accomplish the above object, the present invention also provides a method for controlling the landing of a drone, the method including a landing control device setting a maximum transmission radius to be a transmission range; the landing control device transmitting a landing control signal in the set transmission range; the landing control device varying the transmission range based on whether a response signal to the transmitted landing control signal is received; and the landing control device transmitting a landing signal if the varied transmission range is equal to or less than a minimum transmission radius.

Varying the transmission range, which is performed by the landing control device, may include decreasing the transmission range if a response signal to the transmitted landing control signal is received within a set period of time; and increasing the transmission range if no response signal to the transmitted landing control signal is received within the set period of time.

The method may further include a drone that receives the landing control signal setting a flight mode and flight distance based on the landing control signal and flying in a control signal-based flight mode.

Flying in a control signal-based flight mode, performed by the drone, may include detecting a 3 directional landing control signal strength based on the received landing control signal; calculating three directional distances, namely X, Y, and Z direction distances, between a current location and a landing control device based on the detected 3 directional landing control signal strength; setting a flight mode and flight distance based on the three directional distances; and flying in a control signal-based flight mode based on the flight mode and flight distance.

The method may further include the drone that receives the landing signal operating in a landing mode to land at a destination based on the landing signal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Figure 1:
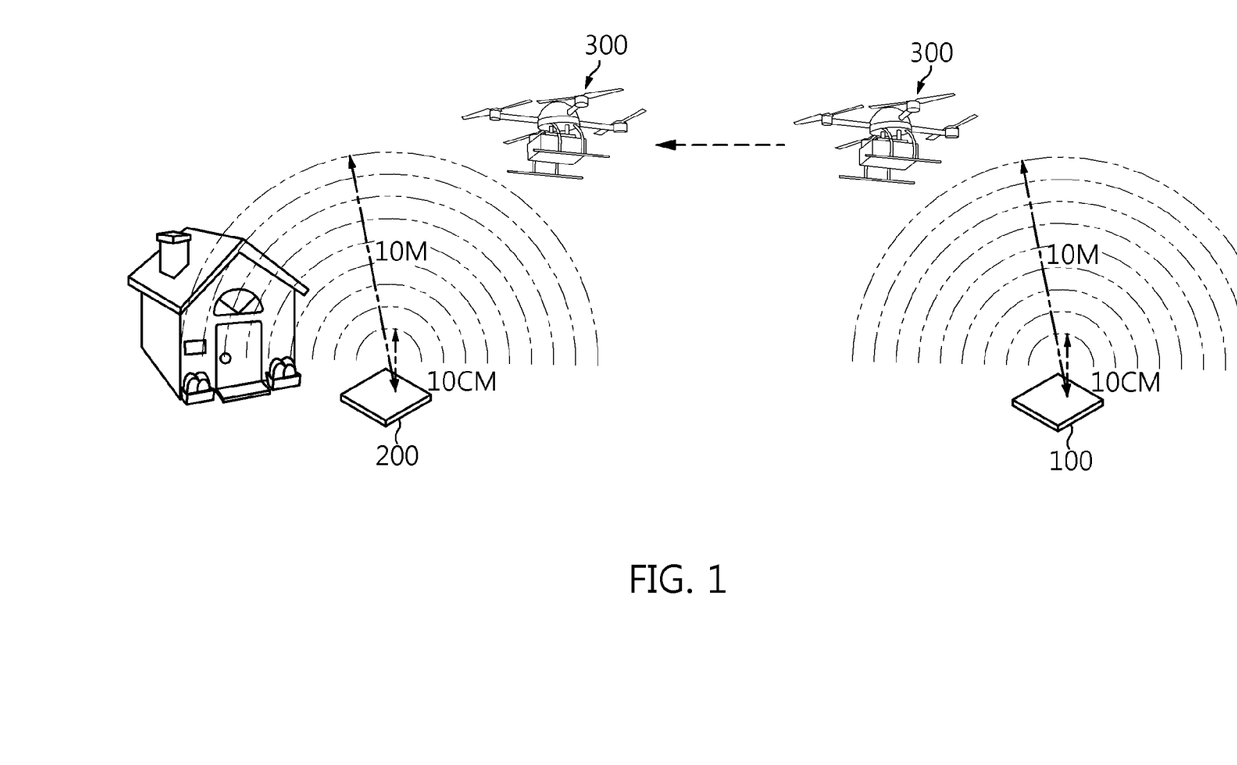
FIG. 1 shows views for explaining a system for controlling the takeoff and landing of a drone, according to an embodiment of the present invention.
Figure 2:
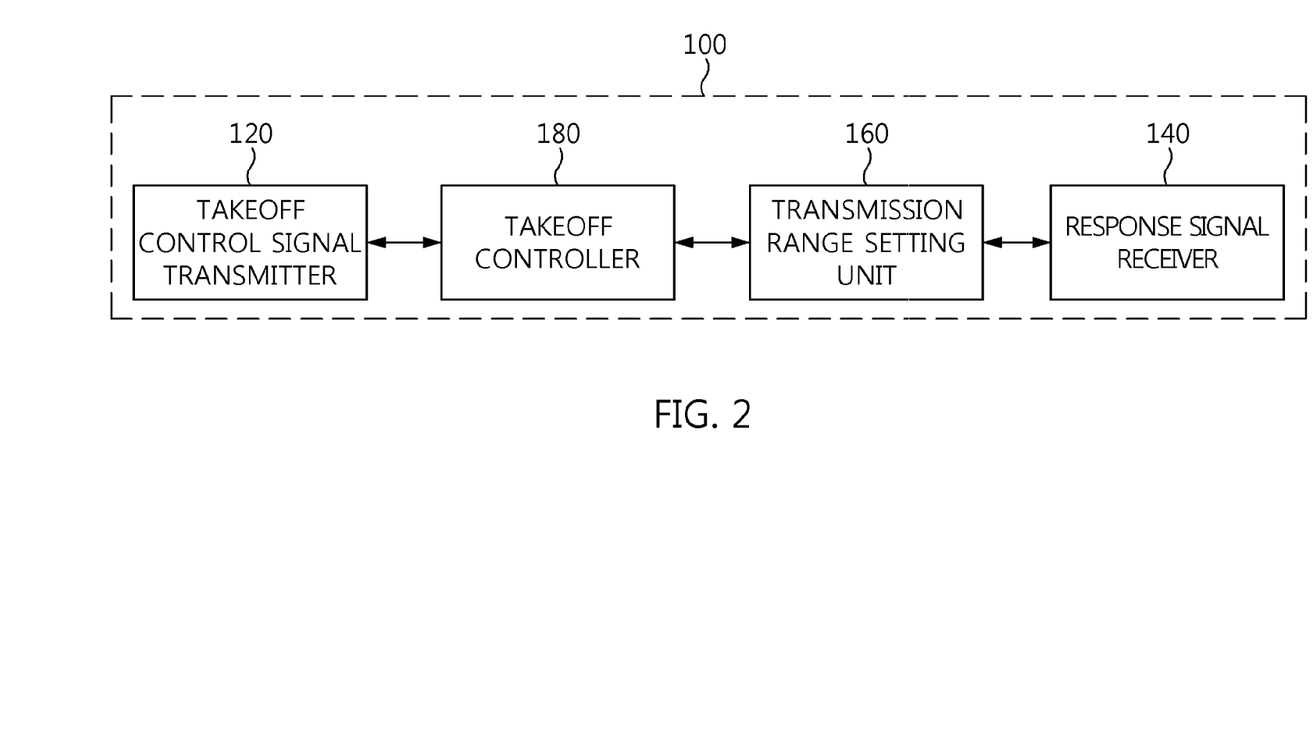
FIG. 2 is a block diagram of the takeoff control device of FIG. 1.
Figure 3:
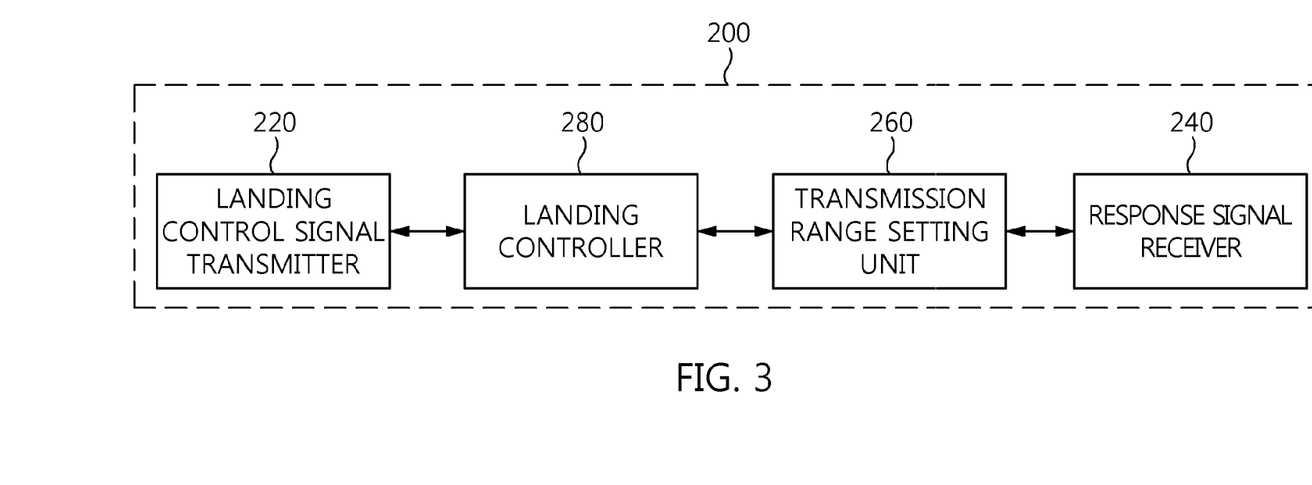
FIG. 3 is a block diagram of the landing control device of FIG. 1.
Figure 4:
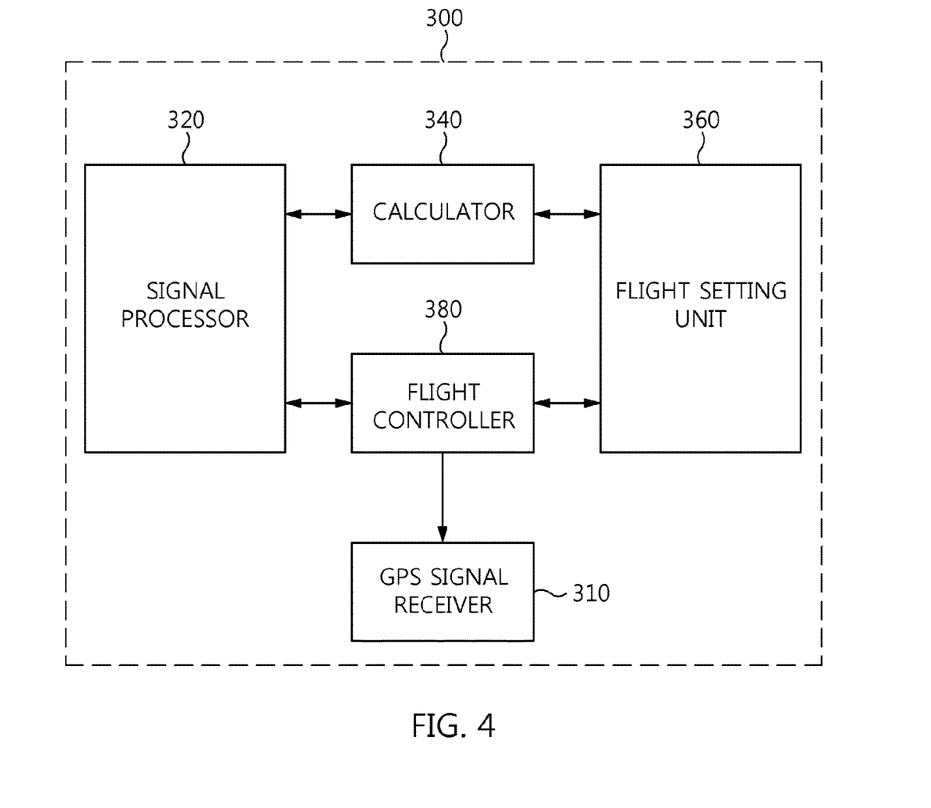
FIG. 4 is a block diagram of the drone of FIG. 1.

The system for controlling the takeoff and landing of a drone in accordance with an embodiment of the present invention will now be described in detail with reference to the accompanying drawings. FIG. 1 shows views for explaining a system for controlling the takeoff and landing of a drone, according to an embodiment of the present invention. FIG. 2 is a block diagram of the takeoff control device of FIG. 1, FIG. 3 is a block diagram of the landing control device of FIG. 1, and FIG. 4 is a block diagram of the drone of FIG. 1.

As shown in FIG. 1, a system for controlling the landing of a drone may include a takeoff control device 100, a landing control device 200, and a drone 300.

The takeoff control device 100 is installed at a departure place for transmitting low frequency (LF) takeoff control signals to control the takeoff of the drone 300. The takeoff control device 100 varies the transmission range of takeoff control signals based on whether a response signal is received from the drone 300. For example, the takeoff control device 100 transmits takeoff control signals by setting a minimum transmission radius (e.g., about 10 cm) to be a transmission range. The takeoff control device 100 sequentially increases the transmission range when a response to a takeoff control signal is received from the drone 300. In this regard, the takeoff control device 100 sequentially increases the transmission range up to a maximum transmission radius (e.g., about 10 m). With the increased transmission range, the takeoff control device 100 reduces the transmission range back to the previous transmission range if no response signal is received from the drone 300 within a set period of time. In this way, the takeoff control device 100 increases or decreases the transmission range within a range from the minimum transmission radius to the maximum transmission radius based on whether a response signal is received from the drone 300 to control the drone 300 to take off to an accurate location. If the transmission range is set to the maximum transmission radius, the takeoff control device 100 transmits a flight signal with a takeoff control signal.

For this, as shown in FIG. 2, the takeoff control device 100 may include a takeoff control signal transmitter 120, a response signal receiver 140, a transmission range setting unit 160, and a takeoff controller 180.

The takeoff control signal transmitter 120 transmits a takeoff control signal to control the takeoff of the drone 300 under the control of the takeoff controller 180. For example, the takeoff control signal transmitter 120 receives a transmission request message from the takeoff controller 180. The takeoff control signal transmitter 120 detects the transmission range from the received transmission request message.

The takeoff control signal transmitter 120 transmits a low frequency (LF) takeoff control signal based on the detected transmission range. At this time, the takeoff control signal transmitter 120 may transmit a takeoff control signal, divided into X, Y, and Z-direction signals, and may sequentially transmit the X, Y, and Z-direction signals.

The response signal receiver 140 receives a response signal to a takeoff control signal from the drone 300 located within the transmission range. When receiving the response signal to the takeoff control signal, output from the takeoff control signal transmitter 120, from the drone 300, the response signal receiver 140 transmits a response signal reception message to the takeoff controller 180.

The transmission range setting unit 160 sets the transmission range of takeoff control signals to control the takeoff of the drone 300. For example, the transmission range setting unit 160 sets the transmission range of LF takeoff control signals. Specifically, the transmission range setting unit 160 sets maximum and minimum transmission radii in advance, and also sets the transmission range from the minimum transmission radius to the maximum transmission radius.

In an initial state, the transmission range setting unit 160 sets the minimum transmission radius to be the transmission range. For example, the transmission range setting unit 160 determines that it is in an initial state if the takeoff control device 100 is initially driven or if the drone 300 has already taken off (i.e., the drone 300 has transmitted a flight signal). If determining that it is in the initial state, the transmission range setting unit 160 sets the minimum transmission radius to be the transmission range.

The transmission range setting unit 160 varies the transmission range based on whether the response signal receiver 140 receives the response signal. For example, the transmission range setting unit 160 varies the transmission range by a set radial unit within the minimum to maximum transmission radius based on whether the response signal receiver 140 receives the response signal. In this regard, the transmission range setting unit 160 may change the set radial unit depending on the set transmission range. For example, in the case where the maximum transmission radius is set to 10 m while the minimum transmission radius is set to 10 cm, if the transmission range is set from 1 m to 10 m, the transmission range setting unit 160 sets the set radial unit to 1 m, or if transmission range is set to 1 m or less, the transmission range setting unit 160 sets the set radial unit to 10 cm.

The transmission range setting unit 160 increases the set transmission range when the response signal receiver 140 receives a response signal from the drone 300. For example, the transmission range setting unit 160 increases the transmission range by the set radial unit when the response signal receiver 140 receives the response signal within a set period of time after the takeoff control signal transmitter 120 transmits the takeoff control signal.

The transmission range setting unit 160 decreases the set transmission range when the response signal receiver 140 receives no response signal from the drone 300. For example, the transmission range setting unit 160 decreases the transmission range by the set radial unit when the response signal receiver 140 receives no response signal within a set period of time after the takeoff control signal transmitter 120 has transmitted the takeoff control signal.

The takeoff controller 180 controls the takeoff control signal transmitter 120 to transmit a takeoff control signal within the set transmission range. Specifically, the takeoff controller 180 creates a transmission request message including the transmission range set by the transmission range setting unit 160. The takeoff controller 180 sends the transmission request message to the takeoff control signal transmitter 120.

The takeoff controller 180 controls the takeoff control signal transmitter 120 to transmit a flight signal if the transmission range set by the transmission range setting unit 160 is equal to or greater than the maximum transmission radius. That is, the takeoff controller 180 controls the takeoff of the drone 300 based on the transmission range and the maximum transmission radius. Specifically, the takeoff controller 180 determines that the drone has taken off if the transmission range set by the transmission range setting unit 160 is equal to or greater than the maximum transmission radius. If determining that the drone has taken off, the takeoff controller 180 creates a transmission request message including the transmission range and a flight request signal. The takeoff controller 180 sends the transmission request message to the takeoff control signal transmitter 120.

The landing control device 200 may be installed at a destination (e.g., a home, office, etc.) that transmits LF landing control signals to control the landing of the drone 300. The landing control device 200 varies the transmission range of landing control signals based on whether a response signal is received from the drone 300. For example, the landing control device 200 transmits landing control signals by setting a maximum transmission radius (e.g., about 10 m) to be a transmission range. The landing control device 200 sequentially decreases the transmission range when a response to a landing control signal is received from the drone 300. In this regard, the landing control device 200 sequentially decreases the transmission range down to a minimum transmission radius (e.g., about 10 cm). With the decreased transmission range, the landing control device 200 increases the transmission range back to the previous transmission range if no response signal is received from the drone 300 within a set period of time. In this way, the landing control device 200 increases or decreases the transmission range within a range from the minimum transmission radius to the maximum transmission radius so as to control the drone 300 to land at an accurate location, based on whether a response signal is received from the drone 300. If the minimum transmission radius is set to be the transmission range, the landing control device 200 transmits a landing signal with a landing control signal.

For this, as shown in FIG. 3, the landing control device 200 may include a landing control signal transmitter 220, a response signal receiver 240, a transmission range setting unit 260, and a landing controller 280.

The landing control signal transmitter 220 transmits a landing control signal to control the landing of the drone 300 under the control of the landing controller 280. For example, the landing control signal transmitter 220 receives a transmission request message from the landing controller 280. The landing control signal transmitter 220 detects the transmission range from the received transmission request message. The landing control signal transmitter 220 transmits an LF landing control signal based on the detected transmission range. At this time, the landing control signal transmitter 220 may transmit a landing control signal divided into X, Y, and Z-direction signals, and may sequentially transmit the X, Y, and Z-direction signals.

The response signal receiver 240 receives a response signal to a landing control signal from the drone 300, which has entered a location within the transmission range. When receiving the response signal to the landing control signal output from the landing control signal transmitter 220 from the drone 300, the response signal receiver 240 sends a response signal reception message to the landing controller 280.

The transmission range setting unit 260 sets the transmission range of landing control signals to control the landing of the drone 300. For example, the transmission range setting unit 260 sets the transmission range of LF landing control signals. Specifically, the transmission range setting unit 260 sets maximum and minimum transmission radii in advance, and also sets the transmission range from the minimum transmission radius to the maximum transmission radius.

In an initial state, the transmission range setting unit 260 sets the maximum transmission radius to be the transmission range. For example, the transmission range setting unit 260 determines that it is in an initial state if the landing control device 200 is initially driven or if the drone 300 has already landed (i.e., the drone 300 has transmitted a landing signal). If determining that it is in the initial state, the transmission range setting unit 260 sets the maximum transmission radius to be the transmission range.

The transmission range setting unit 260 varies the transmission range based on whether the response signal receiver 240 receives the response signal. For example, the transmission range setting unit 260 varies the transmission range by a set radial unit within the minimum to maximum transmission radius based on whether the response signal receiver 240 receives the response signal. In this regard, the transmission range setting unit 260 may change the set radial unit depending on the set transmission range. For example, in the case where the maximum transmission radius is set to 10 m while the minimum transmission radius is set to 10 cm, if the transmission range is set from 1 m to 10 m, the transmission range setting unit 260 sets the set radial unit to 1 m, or if transmission range is set to 1 m or less, the transmission range setting unit 160 sets the set radial unit to 10 cm.

The transmission range setting unit 260 decreases the set transmission range if the response signal receiver 240 receives a response signal from the drone 300. For example, the transmission range setting unit 260 decreases the transmission range by the set radial unit if the response signal receiver 240 receives the response signal within a set period of time after the landing control signal transmitter 220 has transmitted the landing control signal.

The transmission range setting unit 260 increases the set transmission range if the response signal receiver 240 receives no response signal from the drone 300. For example, the transmission range setting unit 260 increases the transmission range by the set radial unit if the response signal receiver 240 receives no response signal within a set period of time after the landing control signal transmitter 220 has transmitted the landing control signal.

The landing controller 280 controls the landing control signal transmitter 220 to transmit a landing control signal within a set transmission range. Specifically, the landing controller 280 creates a transmission request message including the transmission range set by the transmission range setting unit 260. The landing controller 280 sends the transmission request message to the landing control signal transmitter 220.

The landing controller 280 controls the landing control signal transmitter 220 to transmit a landing signal if the transmission range set by the transmission range setting unit 260 is equal to or less than the minimum transmission radius. That is, the landing controller 280 controls the landing of the drone 300 based on the transmission range and the minimum transmission radius. Specifically, the landing controller 280 determines that the drone is landing if the transmission range set by the transmission range setting unit 260 is equal to or less than the minimum transmission radius. If determining that the drone is landing, the landing controller 280 creates a transmission request message including the transmission range and a landing request signal. The landing controller 280 sends the transmission request message to the landing control signal transmitter 220.

The drone 300 takes off from the departure place based on a takeoff control signal received from the takeoff control device 100 and flies to a location as far as it is able to fly based on a GPS signal. In other words, the drone 300 receives the takeoff control signal transmitted from the takeoff control device 100. The drone 300 transmits a response signal to the received takeoff control signal to the landing control device 200. At this time, if the takeoff control signal is received from the takeoff control device 100 for the first time, the drone 300 detects the takeoff control signal strength (i.e., the Received Signal Strength Indication (RSSI) of the takeoff control signal) in three directions (i.e. X, Y, and Z directions). The drone 300 calculates distances in the three directions (the three directional distances) based on the detected 3 directional takeoff control signal strength and the reference strength of the takeoff control signal. The distances in the three directions calculated by the drone 300 refer to X, Y, and Z direction distances between the current location and the target takeoff point of the drone 300. The drone 300 sets the flight mode and flight distance based on the calculated three directional distances. The drone 300 flies to the destination using the set destination information and GPS information when it receives a flight signal from the takeoff control device 100 during flight based on the set flight mode and flight distance.

When receiving a landing control signal from the landing control device 200 during flight based on the GPS information, the drone 300 lands at the destination based on the received landing control signal. In other words, the drone 300 receives the landing control signal transmitted from the landing control device 200. The drone 300 transmits a response signal to the received landing control signal to the landing control device 200. At this time, if the landing control signal is received from the landing control device 200 for the first time, the drone 300 detects the landing control signal strength (i.e. the RSSI of the landing control signal) in three directions (i.e. X, Y, and Z directions). The drone 300 calculates distances in the three directions (three directional distances) based on the detected landing control signal strength in the three directions and the reference strength of the landing control signal. The distances in the three directions calculated by the drone 300 refer to X, Y, and Z direction distances between the current location of the drone 300 and the landing control device 200. The drone 300 sets a flight mode and flight distance based on the calculated three directional distances. When it receives a landing signal from the landing control device 200 during flight based on the set flight mode and flight distance, the drone 300 flies according to the finally set flight mode and flight distance and then lands at the destination.

For this, as shown in FIG. 4, the drone 300 may include a GPS signal receiver 310, a signal processor 320, a calculator 340, a flight setting unit 360, and a flight controller 380.

The GPS signal receiver 310 receives a GPS signal from a GPS satellite. The GPS signal receiver 310 forwards the received GPS signal to the flight controller 380.

The signal processor 320 includes a three axis receiving antenna (sensor) driven by a control signal transmitted from the takeoff control device 100 or landing control device 200, i.e., the takeoff control signal or the landing control signal. That is, the signal processor 320 is driven by a control signal received from the takeoff control device 100 or the landing control device 200 to receive the control signal. The signal processor 320 switches itself into a standby state if no control signal is received for a set period of time.

The signal processor 320 transmits a response signal to the control signal to the takeoff control device 100 or the landing control device 200. Again, the signal processor 320 sends a response signal to the takeoff control device 100 after receiving a takeoff control signal. The signal processor 320 sends a response signal to the landing control device 200 after receiving a landing control signal.

The signal processor 320 detects the three directional control signal strength from the received control signal. Specifically, the signal processor 320 detects X, Y, and Z direction (or axis) signals from the received takeoff control signal and senses the takeoff control signal strength in respective directions (i.e., RSSIs in X, Y, and Z directions). The signal processor 320 detects X, Y, and Z direction (or axis) signals from the received landing control signal and senses the landing control signal strength in respective directions (i.e., RSSIs in X, Y, and Z directions). The signal processor 320 sends the sensed three directional control signal strength to the calculator 340.

The calculator 340 calculates three directional distances based on the strength of the three directional control signals received from the signal processor 320. Specifically, the calculator 340 calculates three directional distances based on the strength of the three received directional control signals and a reference signal strength (i.e., a takeoff control signal output value or landing control signal output value). In this regard, the calculator 340 calculates the three dimensional distances using the following equation 1. The three directional distances refer to X, Y, and Z direction distances between the target takeoff point (e.g. a flight point using a GPS signal) and the current location of the drone 300 when using the takeoff control signal strength, or refer to X, Y, and Z direction distances between the landing control device 200 and the current location of the drone 300 when using the landing control signal strength.

$$X \text{ direction distance} = \frac{\text{reference signal strength}}{X \text{ direction landing control signal strength}}$$
$$Y \text{ direction distance} = \frac{\text{reference signal strength}}{Y \text{ direction landing control signal strength}}$$
$$Z \text{ direction distance} = \frac{\text{reference signal strength}}{Z \text{ direction landing control signal strength}}$$

(1)

The flight setting unit 360 sets the flight mode based on the current location of the drone 300. Specifically, the flight setting unit 360 sets a control signal-based flight mode or a GPS signal-based flight mode based on the current location of the drone 300. In this regard, the flight setting unit 360 sets the GPS signal-based flight mode if the current location of the drone 300 is the target takeoff point, or otherwise, sets the control signal-based flight mode.

In the control signal-based flight mode, the flight, setting unit 360 sets the flight mode based on the three directional distances calculated by the calculator 340 and the current location of the drone 300. Specifically, the flight setting unit 360 sets the current location of the drone 300 as a starting location, and sets the flight mode to straight flight or axial flight based on the three directional distances. Straight flight refers to the shortest distance flight using the three directional distances and the starting location, and axial flight refers to 3 directional stepwise flight taking into account obstacles and weather conditions.

The flight setting unit 360 sets a flight distance based on the flight mode and the three directional distances calculated by the calculator 340. That is, the flight setting unit 360 sets the straight distance or the three directional flight distances based on the set flight mode.

When the straight flight is set, the flight setting unit 360 uses the three directional distances to calculate the distance in a straight line (i.e., the shortest distance from the current location of the drone 300 to the landing control device 200 or the target takeoff point). The flight setting unit 360 sets the calculated distance in a straight line to be the flight distance.

When the axial flight is set, the flight setting unit 360 sets flight distances in X, Y, and Z directions. In this regard, the flight setting unit 360 sets the calculated distances in X, Y, and Z directions to be flight distances in the respective directions. The flight setting unit 360 may set three directional flight distances by setting all of the distances in X, Y, and Z directions to be flight distances in the respective directions, or may even set a plurality of flight distances for each of the three directions by dividing each distance in X, Y, and Z directions into multiple steps.

The flight controller 380 controls the flight of the drone 300 based on the flight mode set by the flight setting unit 360. Specifically, in the GPS signal-based flight mode, the flight controller 380 controls the flight of the drone 300 based on a GPS signal received from the GPS signal receiver 310 and the preset location of the destination.

The flight controller 380 controls the flight of the drone 300 based on the flight mode and flight distance set by the flight setting unit 360 in the control signal-based flight mode. That is, the flight controller 380 controls the flight of the drone 300 based on the flight mode and flight distance set by the flight setting unit 360 on the basis of the control signal.

The flight controller 380 controls the landing of the drone 300 based on the landing control signal received by the signal processor 320. For example, the flight controller 380 controls the drone 300 to operate in a landing mode if the landing control signal includes a landing signal.

Figure 5:
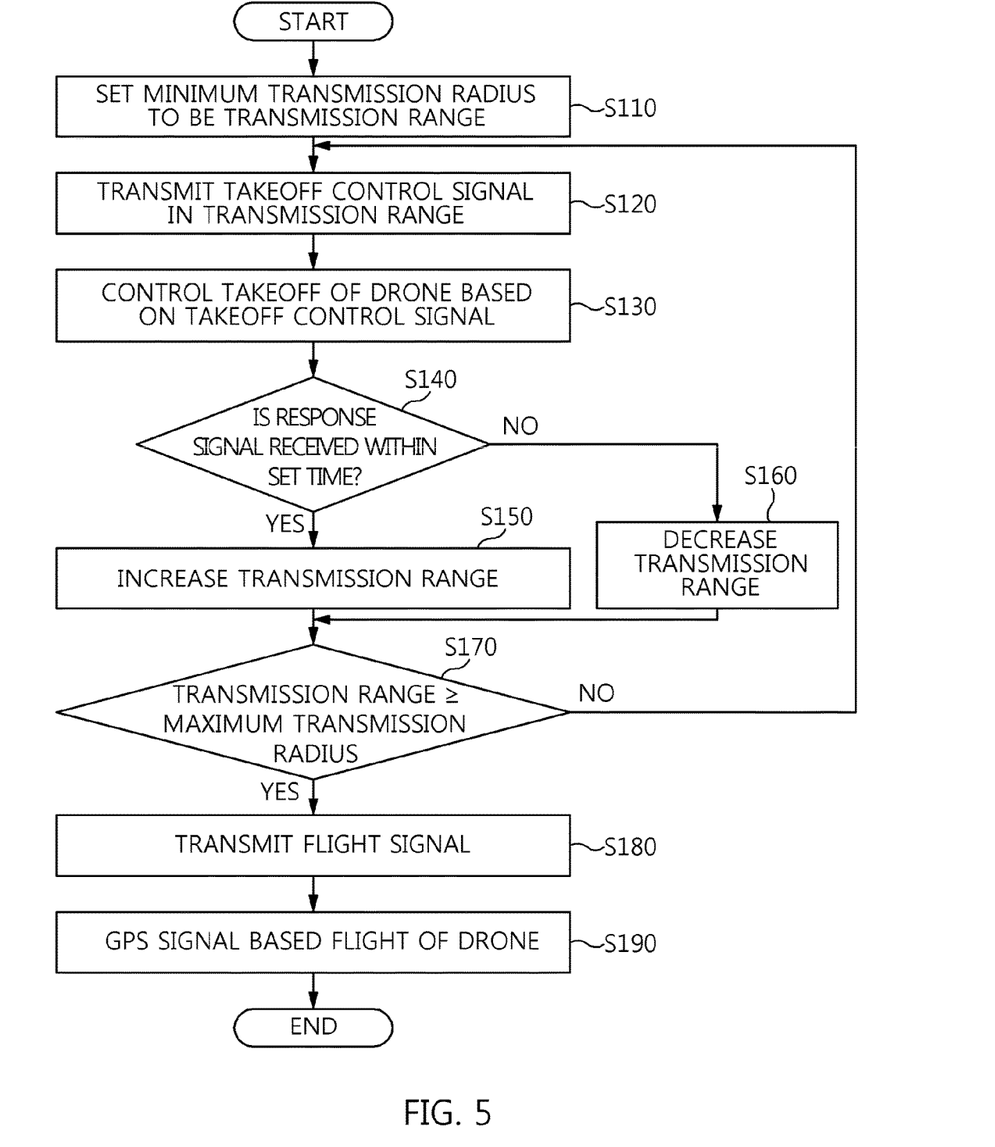
FIGS. 5 and 6 are flowcharts illustrating a method for controlling the takeoff of a drone, according to an embodiment of the present invention.
Figure 6:
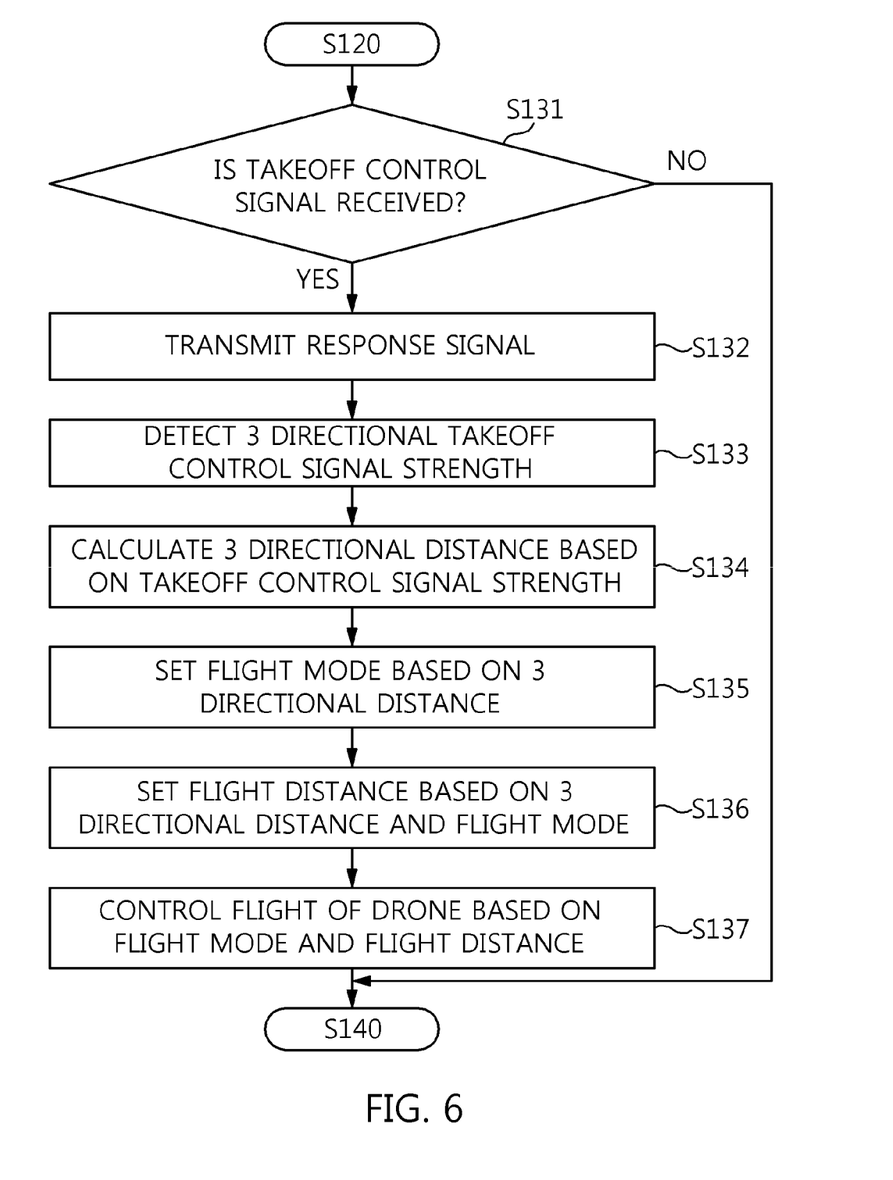

The method for controlling the takeoff of a drone in accordance with an embodiment of the present invention will now be described in detail with reference to accompanying drawings. FIGS. 5 and 6 are flowcharts illustrating a method for controlling the takeoff of a drone according to an embodiment of the present invention.

The takeoff control device 100 sets maximum and minimum transmission radii in order to set a transmission range of takeoff control signals, which are LF signals. The takeoff control device 100 sets the minimum transmission radius to be the transmission range in step S110. For example, the takeoff control device 100 sets the minimum transmission radius to be the transmission range by determining that it is in an initial state if the takeoff control device 100 is initially driven or the drone 300 has already taken off (i.e., a flight signal has been transmitted).

The takeoff control device 100 transmits a takeoff control signal in the set transmission range in step S120. For example, the takeoff control device 100 transmits a takeoff control signal in the transmission range set in step S110 to control the takeoff of the drone 300. At this time, the takeoff control device 100 may transmit a takeoff control signal divided into X, Y, and Z-direction signals, and may sequentially transmit the X, Y, and Z-direction signals.

The drone 300 performs takeoff control based on the takeoff control signal received from the takeoff control device 100 in step S130. This will be further described below in connection with FIG. 6.

Once the takeoff control signal transmitted from the takeoff control device 100 is received, e.g., in step S131, the drone 300 transmits a response signal to the takeoff control device 100 in step S132.

The drone 300 detects 3 directional takeoff control signal strength based on the received takeoff control signal in step 133. Specifically, the drone 300 detects takeoff control signal strength in three directions (X, Y, and Z directions (or axes)) through a three axis receiving antenna (sensor).

The drone 300 calculates three directional distances based on the detected takeoff control signal strength in three directions in step S134. Specifically, the drone 300 calculates the three directional distances based on the takeoff control signal strength in the three directions detected in step S133 and the reference signal strength (i.e., a takeoff control signal output value). In this regard, the drone 300 calculates the three directional distances in X, Y, and Z directions between the current location and the target takeoff point.

The drone 300 sets a flight mode based on the calculated three directional distances in step S135. For example, the drone 300 sets a flight mode based on the three directional distances, calculated in step S134, and the current location of the drone 300. Specifically, the drone 300 sets the current location of the drone 300 as the starting location, and sets the flight mode to straight flight or axial flight based on the three directional distances. Straight flight refers to the shortest flight distance using the three directional distances and the starting location, and axial flight refers to three directional stepwise flight, taking into account obstacles and weather conditions.

The drone 300 sets a flight distance based on the calculated three directional distances and the flight mode in step S136. Specifically, the drone 300 sets one of a straight-line distance and three directional flight distances to be the flight distance based on the three directional distances calculated in step S134 and the flight mode set in step S135. When the straight flight is set in step S135, the drone 300 uses the three directional distances to calculate the distance in a straight line (i.e., the shortest distance from the current location of the drone 300 to the target takeoff point). The flight setting unit 260 sets the calculated distance in a straight line as the flight distance.

When the axial flight is set in step S135, the drone 300 may set flight distances in X, Y, and Z directions. In this regard, the drone 300 sets the distances in X, Y, and Z directions, calculated in step S134, to be flight distances in the respective directions. The drone 300 may set three directional flight distances by setting all the distances in X, Y, and Z directions to be flight distances in the respective directions, or may even set a plurality of flight distances for each of the three directions by dividing each distance in X, Y, and Z directions by multiple steps.

The drone 300 flies based on the set flight mode and flight distance in step S137.

The takeoff control device 100 varies the transmission range by a set radial unit within the minimum to maximum transmission radius based on whether a response signal is received from the drone 300. For example, if the response signal is received from the drone 300 within a set period of time in step S140, the takeoff control device 100 increases the transmission range in step S150. Specifically, if the response signal to the takeoff control signal transmitted in step S120 is received within the set period of time, the takeoff control device 100 increases the transmission range by the set radial unit.

If no response signal is received from the drone 300 within the set period of time, the takeoff control device 100 decreases the transmission range in step S160. Specifically, if the response signal to the takeoff control signal transmitted in step S120 is not received within the set period of time, the takeoff control device 100 decreases the transmission range by the set radial unit.

If the varied transmission range is equal to or greater than the maximum transmission radius in step S170, the takeoff control device 100 transmits a flight signal to the drone 300 in step S180. That is, the takeoff control device 100 transmits a flight signal for GPS signal-based flight if the transmission range, varied in step S150 or S160, is equal to or greater than the maximum transmission radius. In this regard, the takeoff control device 100 transmits the takeoff signal in the takeoff control signal, or separately transmits the takeoff control signal and the takeoff signal.

The drone 300 flies in the GPS signal-based flight mode, based on the flight signal received from the takeoff control device 100, in step S190. For example, when the drone 300 receives the flight signal, it flies according to GPS signals received from GPS satellites and the location of the destination.

Figure 7:
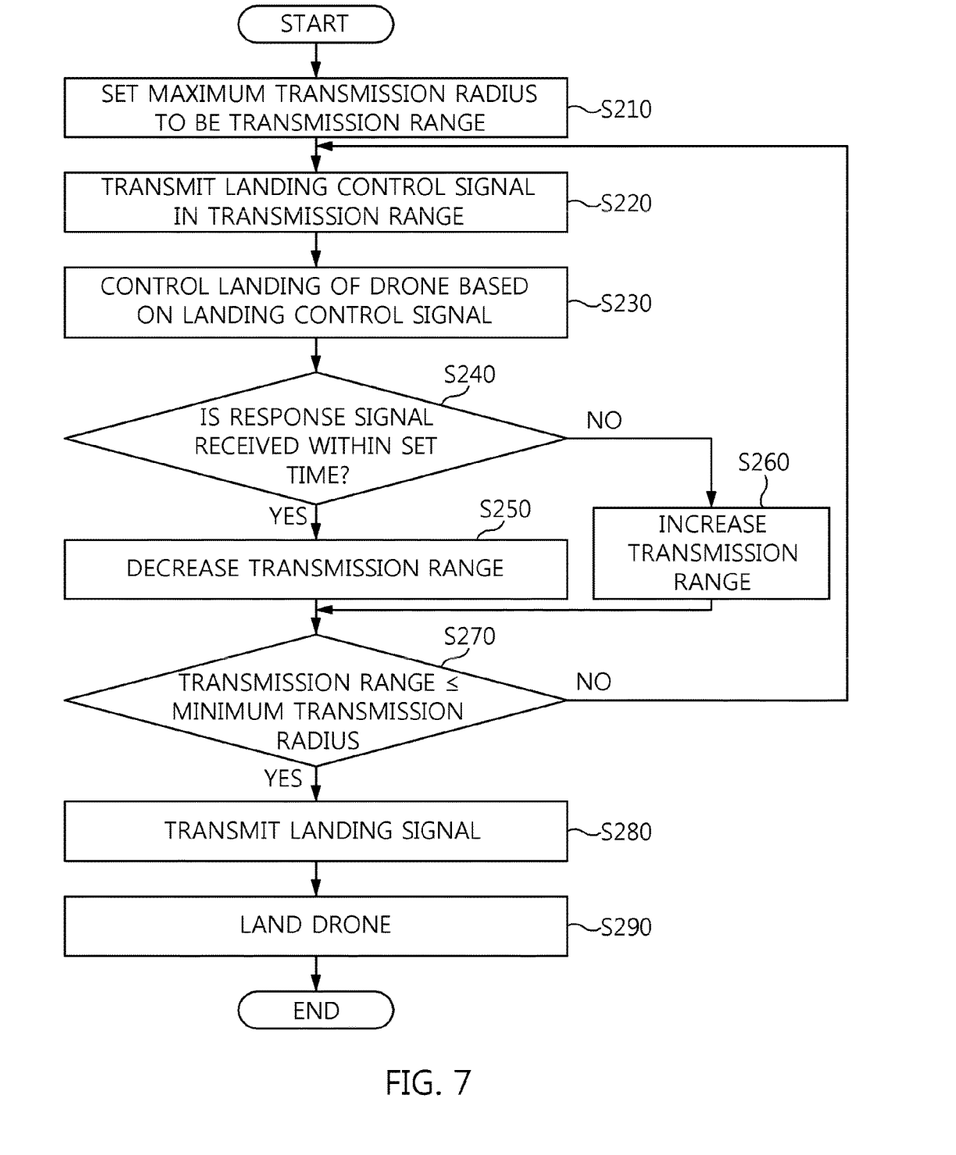
FIGS. 7 and 8 are flowcharts illustrating a method for controlling the landing of a drone, according to an embodiment of the present invention.
Figure 8:
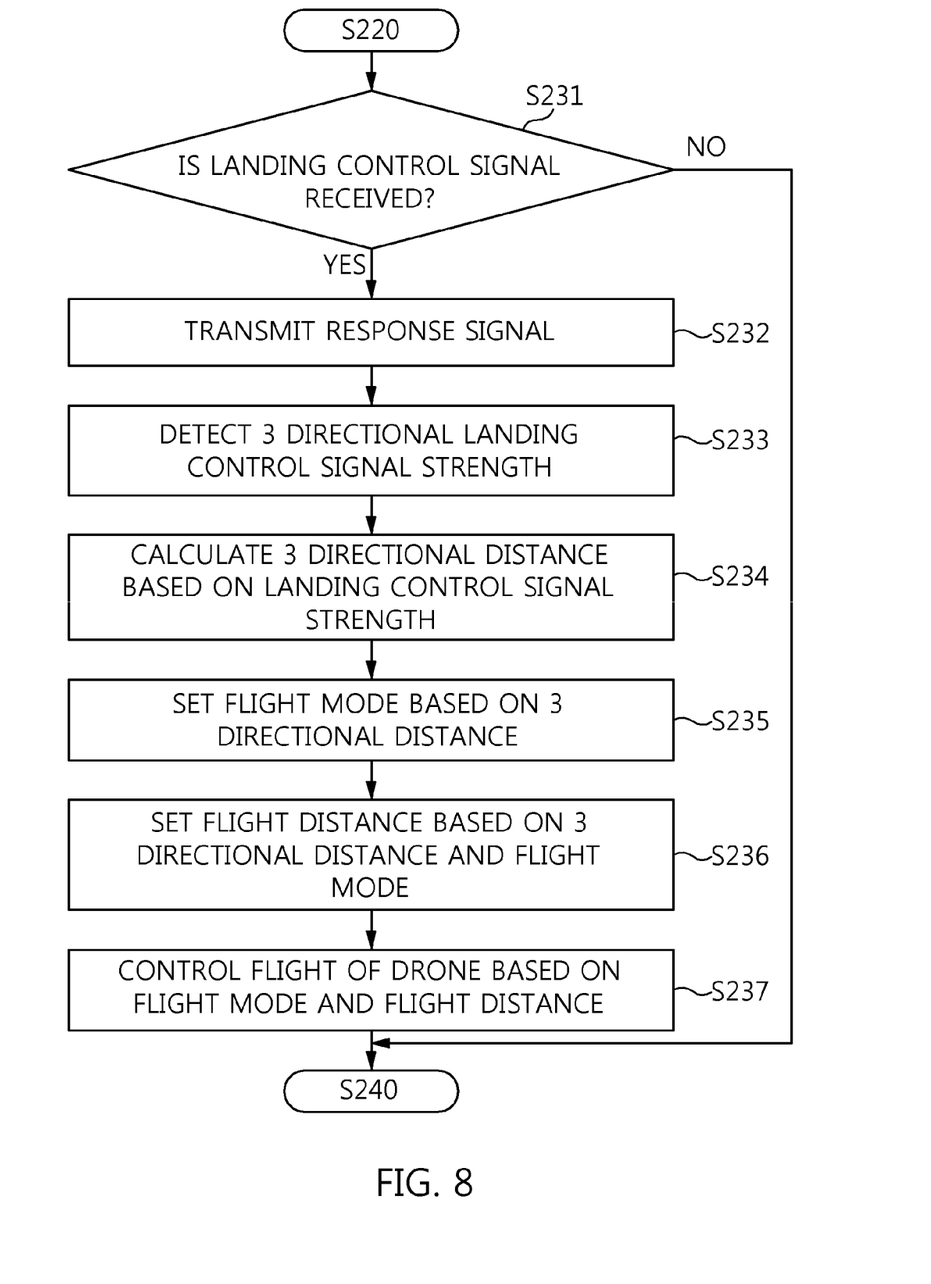

The method for controlling the landing of a drone in accordance with an embodiment of the present invention will now be described in detail with reference to the accompanying drawings. FIGS. 7 and 8 are flowcharts illustrating the method for controlling the landing of a drone according to an embodiment of the present invention.

The landing control device 200 sets maximum and minimum transmission radii in order to set the transmission range of landing control signals, which are LF signals. The landing control device 200 sets the maximum transmission radius to be the transmission range in step S210. For example, the landing control device 200 sets the maximum transmission radius to be the transmission range by determining that it is in an initial state if the landing control device 200 is initially driven or the drone 300 has already landed (i.e., a landing signal has been transmitted).

The landing control device 200 transmits a landing control signal in the set transmission range in step S220. For example, the landing control device 200 transmits a landing control signal in the transmission range set in step S210 to control the landing of the drone 300. At this time, the landing control device 200 may transmit a landing control signal divided into X, Y, and Z-direction signals, and may sequentially transmit the X, Y, and Z-direction signals.

The drone 300 performs landing control based on the landing control signal received from the landing control device 200 in step S230. This will be further described below in connection with FIG. 8.

Once the landing control signal transmitted from the landing control device 200 is received, i.e. in step S231, the drone 300 transmits a response signal to the landing control device 200 in step S232.

The drone 300 detects 3 directional landing control signal strength based on the received landing control signal in step 233. Specifically, the drone 300 detects landing control signal strength in three directions (X, Y, and Z directions (or axes)) through a three axis receiving antenna (sensor).

The drone 300 calculates three directional distances based on the detected landing control signal strength in three directions in step S234. Specifically, the drone 300 calculates the three directional distances based on the landing control signal strength in the three directions detected in step S233 and the reference signal strength (i.e. a landing control signal output value). In this regard, the drone 300 calculates the three directional distances in X, Y, and Z directions between the current location and the landing control device 200.

The drone 300 sets a flight mode based on the calculated three directional distances in step S235. For example, the drone 300 sets a flight mode based on the three directional distances, calculated in step S234, and the current location of the drone 300. Specifically, the drone 300 sets the current location of the drone 300 as a starting location, and sets the flight mode to straight flight or axial flight based on the three directional distances. Straight flight refers to the shortest flight distance using the three directional distances and the starting location, and axial flight refers to 3 directional stepwise flight, taking into account obstacles and weather conditions.

The drone 300 sets a flight distance based on the calculated three directional distances and the flight mode in step S236. Specifically, the drone 300 sets one of a straight-line distance and three directional flight distances to be the flight distance based on the three directional distances calculated in step S234 and the flight mode set in step S235. When the straight flight is set in step S235, the drone 300 uses the three directional distances to calculate the distance in a straight line (i.e., the shortest distance from the current location of the drone 300 to the landing control device 200). The flight setting unit 260 sets the calculated distance in a straight line as the flight distance.

When the axial flight is set in step S235, the drone 300 may set flight distances in X, Y, and Z directions. In this regard, the drone 300 sets the distances in X, Y, and Z directions, calculated in step S234, to be flight distances in the respective directions. The drone 300 may set three directional flight distances by setting all the distances in X, Y, and Z directions to be flight distances in the respective directions, or may even set a plurality of flight distances for each of the three directions by dividing each distance for X, Y, or Z direction by multiple steps.

The drone 300 flies based on the set flight mode and flight distance in step S237.

The landing control device 200 varies the transmission range by a set radial unit within the minimum to maximum transmission radius based on whether a response signal is received from the drone 300. For example, if the response signal is received from the drone 300 within a set period of time in step S240, the landing control device 200 decreases the transmission range in step S250. Specifically, if the response signal to the landing control signal transmitted in step S220 is received within the set period of time, the landing control device 200 decreases the transmission range by the set radial unit.

If no response signal is received from the drone 300 within the set period of time, the landing control device 200 increases the transmission range in step S260. Specifically, if the response signal to the landing control signal transmitted in step S220 is not received within the set period of time, the landing control device 200 increases the transmission range by the set radial unit.

If the varied transmission range is less than the minimum transmission radius in step S270, the landing control device 200 transmits a landing signal to the drone 300 in step S280. That is, the landing control device 200 transmits a landing signal if the transmission range, varied in step S250 or S260, is less than the minimum transmission radius. In this regard, the landing control device 200 transmits the landing signal in the landing control signal, or separately transmits the landing control signal and the landing signal.

The drone 300 lands at the destination based on the landing signal received from the landing control device 200 in step S290. That is, the drone 300 operates in a landing mode to land at the destination when receiving the landing signal.

According to embodiments of the present invention, the system and method for controlling the takeoff and landing of a drone controls the takeoff and landing of a drone by varying the transmission range based on whether a response signal to a takeoff control signal or a landing control signal has been received, thereby minimizing error in controlling the drone to an accurate location, compared to the conventional drone control method using GPS information.

Furthermore, the system and method for controlling the takeoff and landing of a drone varies the transmission range of low-frequency control signals to minimize takeoff and landing errors of the drone, thereby preventing a delivery drone from making incorrect deliveries or damaging goods.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for controlling takeoff and landing of a drone, the system comprising:
    a control device configured to vary a transmission range of Low Frequency (LF) landing control signals based on whether a response signal to a transmitted landing control signal in the transmission range is received, and to transmit a landing signal if the varied transmission range is less than a minimum radius,
    wherein the control device is further configured to vary a transmission range of LF takeoff control signals based on whether a response signal to a takeoff control signal transmitted range is received, and to transmit a flight signal if the varied transmission range is equal to or greater than a maximum radius; and
    a drone configured to fly in a control signal-based flight mode based on a landing control signal when receiving the landing control signal transmitted from the control device during Global Positioning System (GPS) signal-based flight mode, and to land at a destination by flying in a landing mode when receiving a landing signal from the control device during flight in the control signal-based flight mode,
    wherein the drone comprises a signal processor comprised of a three axis receiving antenna driven by the takeoff control signal for detecting 3 directional takeoff control signal strength from the takeoff control signal.

2. The system of claim 1, wherein the control device further comprises
    a transmission range setting unit configured to set a maximum transmission radius to be a transmission range in an initial state and to vary the transmission range based on whether a response signal to a landing control signal is received;
    a landing control signal transmitter configured to transmit an LF landing control signal based on the transmission range set by the transmission range setting unit; and
    a landing controller configured to control the landing control signal transmitter to transmit a landing signal if the varied transmission range is equal to or less than the minimum transmission radius.

3. The system of claim 2, wherein the transmission range setting unit is configured to
    decrease the transmission range by a set radial unit when receiving a response signal to a landing control signal within a set period of time, and
    increase the transmission range by the set radial unit when receiving no response signal to the landing control signal within the set period of time.

4. The system of claim 1, wherein the drone comprises
    a signal processor comprised of a three axis receiving antenna driven by a landing control signal for detecting 3 directional landing control signal strength from the received landing control signal;
    a calculator configured to calculate three directional distances, including X, Y, and Z direction distances, between a current location and the control device based on the detected 3 directional landing control signal strength and reference signal strength of the landing control signal;
    a flight setting unit configured to set a flight mode and flight distance based on the calculated three directional distances and the current location; and
    a flight controller configured to control the drone in a control signal-based flight mode based on the flight mode and flight distance set by the flight setting unit, and to control the drone in a landing mode when a landing signal is received from the signal processor.

5. The system of claim 1, wherein the drone is configured to
    fly in a control signal-based flight mode based on the takeoff control signal transmitted from the control device, and fly in a GPS signal-based flight mode if receiving a flight signal from the control device during flight in the control signal-based flight mode.

6. The system of claim 1, wherein the device further comprises
    a transmission range setting unit configured to set a minimum transmission radius to be a transmission range in an initial state, and to vary the transmission range based on whether a response signal to a takeoff control signal is received;
    a takeoff control signal transmitter configured to transmit an LF takeoff control signal based on the transmission range set by the transmission range setting unit; and
    a takeoff controller configured to control the takeoff control signal transmitter to transmit a flight signal if the varied transmission range is equal to or greater than the maximum transmission radius.

7. The system of claim 6, wherein the transmission range setting unit is configured to
    increase the transmission range by a set radial unit when receiving a response signal to a takeoff control signal within a set period of time, and
    decrease the transmission range by the set radial unit when receiving no response signal to the takeoff control signal within the set period of time.

8. The system of claim 5, wherein the drone comprises
    a calculator configured to calculate three directional distances including X, Y, and Z direction distances between a current location and a target takeoff point based on the detected three directional takeoff signal strength and reference signal strength of the takeoff control signal;
    a flight setting unit configured to set a flight mode and flight distance based on the calculated three directional distances and the current location; and a flight controller configured to control the drone in a control signal-based flight mode based on the flight mode and flight distance set by the flight setting unit, and to control the drone in a GPS signal-based flight mode when a flight signal is received from the signal processor.

* * * * *